United States Patent [19]
Rutke et al.

[11] Patent Number: 6,006,730
[45] Date of Patent: Dec. 28, 1999

[54] ARRANGEMENT FOR INTEGRATED HANDLING OF LIQUID AND GASEOUS MEDIA FOR AN INTERNAL COMBUSTION ENGINE

[75] Inventors: Peter Rutke, Rhode; Jens Schneemann, Wolfenbüttel, both of Germany

[73] Assignee: Volkswagen AG, Wolfsburg, Germany

[21] Appl. No.: 09/064,919

[22] Filed: Apr. 23, 1998

[30] Foreign Application Priority Data

Apr. 24, 1997 [DE] Germany .......................... 197 17 328

[51] Int. Cl.⁶ .................................................. F02M 31/00
[52] U.S. Cl. .......................................................... 123/542
[58] Field of Search ........................... 123/542; 165/149, 165/166

[56] References Cited

U.S. PATENT DOCUMENTS

| | | | |
|---|---|---|---|
| 2,227,927 | 1/1941 | Downs | 123/542 |
| 4,187,678 | 2/1980 | Herenius . | |
| 4,441,476 | 4/1984 | Roberts et al. | 123/542 |
| 4,474,162 | 10/1984 | Mason | 123/542 |
| 4,823,868 | 4/1989 | Neebel . | |
| 5,213,068 | 5/1993 | Stenfors et al. . | |
| 5,392,604 | 2/1995 | Nikula et al. . | |
| 5,551,234 | 9/1996 | Ochoizki . | |

FOREIGN PATENT DOCUMENTS

| | | |
|---|---|---|
| 4017662 | 12/1991 | Germany . |
| 61-058918 | 3/1986 | Japan . |
| 7902721 | 10/1980 | Netherlands . |

OTHER PUBLICATIONS

Die Schiffsmotoren der neuen MTU–Baureihe 2000 by Von Franz Haug et al.; MTZ Motortechnische Zeitschrift 57 (1996) pp. 540–546.

*Primary Examiner*—Marguerite McMahon
*Attorney, Agent, or Firm*—Baker & Botts, L.L.P.

[57] ABSTRACT

For integrated handling of cooling liquids and combustion gases with the greatest avoidance of external piping, an arrangement to be attached to a cylinder head of an internal combustion engine includes a housing having a body and a cover separated along a parting plane. Inside the housing a passage for conveying intake air has an intake air cooler and intake pipes connecting thereto. Adjacent to a partition in the housing, a heat exchanger for engine cooling water is mounted in a cooler chamber which, like the passage, is covered by a housing cover.

9 Claims, 8 Drawing Sheets

ARRANGEMENT FOR INTEGRATED HANDLING OF LIQUID AND GASEOUS MEDIA FOR AN INTERNAL COMBUSTION ENGINE

SPECIFICATION

BACKGROUND OF THE INVENTION

This invention relates to arrangements for integrated handling of liquid and gaseous media for internal combustion engines.

In U.S. Pat. No. 4,187,678, an arrangement for integrated handling of liquid and gaseous media includes a housing, which is generally of unipartite configuration, mounted on a cylinder head of an internal combustion engine. In this arrangement, a passage for combustion air for the engine extends in a lengthwise direction adjacent to a housing wall facing the engine. A tube bank heat exchanger is arranged inside the housing, adjacent to the outside wall opposite the housing wall.

This arrangement and the associated internal combustion engine are specially designed for marine use. For this purpose, the housing has a connection flange at one end for a turbocharger which forces compressed combustion air into the passage. The combustion air passage has openings through which the intake air passes directly into corresponding openings of intake passages in the cylinder head of the engine.

In a lower portion of the housing, a liquid cooled exhaust gas manifold is connected to exhaust passages of the cylinder head. The engine coolant, which in this case is fresh water, passes from the cylinder head of the engine into this housing portion where it cools the exhaust gas duct and the turbocharger. Depending on the coolant temperature, the engine coolant passes either through the heat exchanger or through a bypass. The heat exchanger conducts seawater in countercurrent flow to the engine coolant. On the side of the engine opposite from the foregoing arrangement, a sea water inlet supplies sea water to an engine oil cooler, then to a transmission oil cooler, and then to an intake air cooler. Consequently, the compressed intake air passes from the turbocharger on the other side of the engine through an intake air line to the intake air cooler and then back into the passage carrying combustion air.

This arrangement is essentially a unipartite housing in integrated form in which the cooling fluid for the engine is conveyed separately from the sea water and in which the compressed intake air is conveyed and the exhaust line is cooled by the engine coolant. However, this arrangement requires the internal combustion engine to have a comparatively large number of pipes or lines to carry the liquid and gaseous media, resulting in a correspondingly large cost for fittings and seals.

The German publication MTZ (Motortechnische Zeitschrift) 57 (1996, No. 10), discloses, at pages 540–546, an internal combustion engine specially designed for marine propulsion which is provided with a V-shaped array of cylinders. At one end of this engine a so-called "service block" includes a cooling water compensation and storage tank and several thermostats and short-circuit passages, as well as oil filters. Below the service block is a plate-type heat exchanger for cooling the engine coolant with sea water. In this arrangement, the service block and the heat exchanger add considerably to the structural length of the internal combustion engine.

SUMMARY OF THE INVENTION

Accordingly, it is an object of the present invention to provide an arrangement for integrated handling of liquid and gaseous media for an internal combustion engine which overcomes the disadvantages of the prior art.

Another object of the invention is to provide an arrangement for integrated handling of liquid and gaseous media for an internal combustion engine which integrates a plurality of functions for the handling and/or cooling of these media in compact form while avoiding external lines and piping to the greatest extent.

These and other objects of the invention are attained by providing a housing of parted configuration with the parting plane extending substantially perpendicularly to the housing wall facing the engine and separating a housing cover from a housing body. Both the housing body and the adjacent housing cover are open to the parting plane. The housing body has a passage supplying combustion air and an adjacent intake pipe cooperating with the engine cylinder head, as well as a heat exchanger, while the housing cover provides an air shaft which covers and seals the combustion air passage. This modular construction provides a number of advantages and is the basis for a number of advantageous modifications.

Thus, this arrangement may be used, for example, for an internal combustion engine either with or without a supercharger for the combustion air without requiring any fundamental change in the housing structure. In the case of a non-supercharged internal combustion engine, the combustion air arrives through the air shaft, then flows through the combustion air passage and enters the adjacent engine intake pipe which supplies the air to the several cylinders. This air flow route is independent of whether the engine has a supercharger.

If a supercharger is provided, then it is a simple matter to include an additional heat exchanger for cooling the air in the passage carrying the combustion air. This heat exchanger, which is preferably liquid cooled, reduces the intake air temperature, thus increasing the efficiency of an internal combustion engine to which the combustion air is supplied. By combining the air supply into the air shaft formed in the housing, it is possible to provide an optimal air flow and uniform air distribution over the length of the heat exchanger. Assuming a perpendicularly installed engine, the heat exchanger is more or less perpendicularly traversed by the intake air, which then enters the intake pipe formed in the body of the housing. The provision of a separate intake pipe for each cylinder inside the body of the housing makes possible further control of the intake air passing through the intake pipe, as well as an exhaust gas return which may be individually controlled cylinder by cylinder.

The heat exchanger, which may be a conventional type and is situated away from the housing wall toward the engine, and the liquid circuit connected to it, provide greater functionality through the cooperation of the housing cover in the arrangement since a liquid reservoir can be formed in the cover alongside the air supply shaft. The reservoir also acts as an expansion vessel, eliminating the need for provision of a separate container with its associated piping.

The arrangement according to the invention may be used to especial advantage on marine internal combustion engines. Hence it is especially preferred that, when an intake air cooler is employed, it should be a natural water/air heat exchanger, i.e., one which may be supplied with sea water. The heat exchanger for the engine coolant, which may be conventional and would be used in any case, is likewise cooled by sea water, and consequently is a liquid/liquid heat exchanger.

An especially simple and effective separation of the various flows of media inside the housing is preferably achieved by providing a partition in the housing, running substantially perpendicularly to the parting plane, this partition being partly in the housing body and partly in the cover. The air supply region is arranged between that partition and the housing wall facing the engine, while the sea water/engine coolant heat exchanger is located on the other side of that partition, away from the engine.

In a further advantageous modification, the housing includes a manifold mounted at one end through which the seawater is supplied to both heat exchangers through an advantageous arrangement of baffles inside the manifold housing. The sea water may also return from the heat exchangers through the manifold and finally be directed through a sea water outlet.

In another advantageous embodiment, the arrangement may include an exhaust gas return for the combustion exhaust. For this purpose, the housing wall facing the engine preferably includes a gutter extending in the lengthwise direction which is closed by a cover to form an exhaust gas return manifold for returned exhaust.

Alternatively to the gutter, a duct for returned exhaust may be cast directly in the housing or inserted in a recess provided for the purpose. Independently of these embodiments, the returned exhaust gas is supplied into the passage or duct and, by way of individual cylinder transverse holes, to the corresponding individual cylinder intake pipes.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 2:
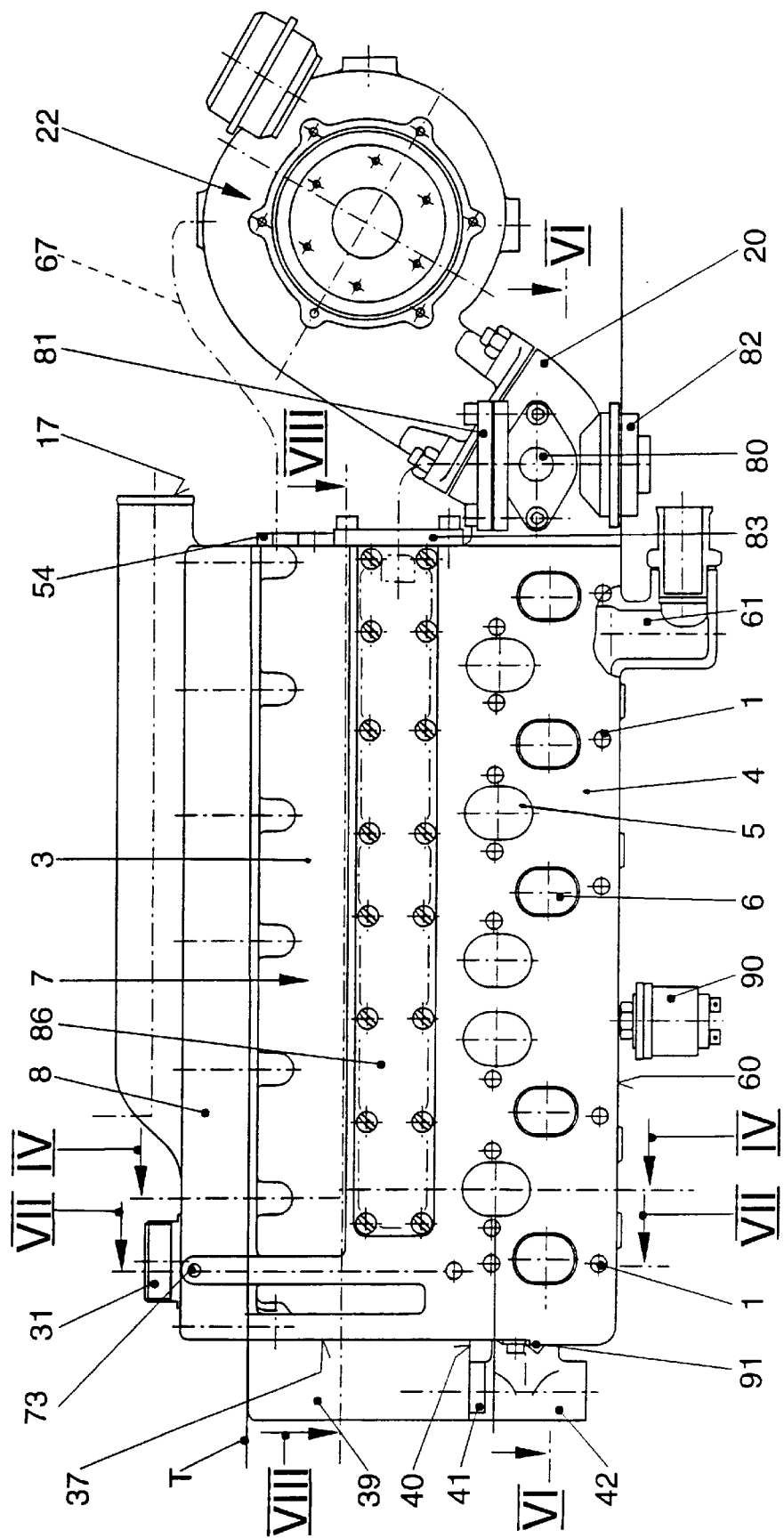
FIG. 2 is a side view of the arrangement looking in the direction of the arrow A in FIG. 1.

In the typical embodiment of the invention shown in the drawings, a housing 2 is arranged to be affixed by screw connections 1, shown in FIG. 2, to a cylinder head of an internal combustion engine (not shown). A housing wall 3 which is mounted against the cylinder head has a mounting flange 4 which contains exit openings 5 for fresh gas supplied to the cylinder head and entrance openings 6 for exhaust received from the cylinder head.

Thus, the exchange of gaseous media takes place by the openings 5 and 6 in the connection flange like the exchange of liquid media to be explained below.

The housing 2 has a bipartite configuration consisting of a housing body 7 and a housing cover 8 which engage each other at a parting plane T as shown in FIG. 2.

Figure 4:
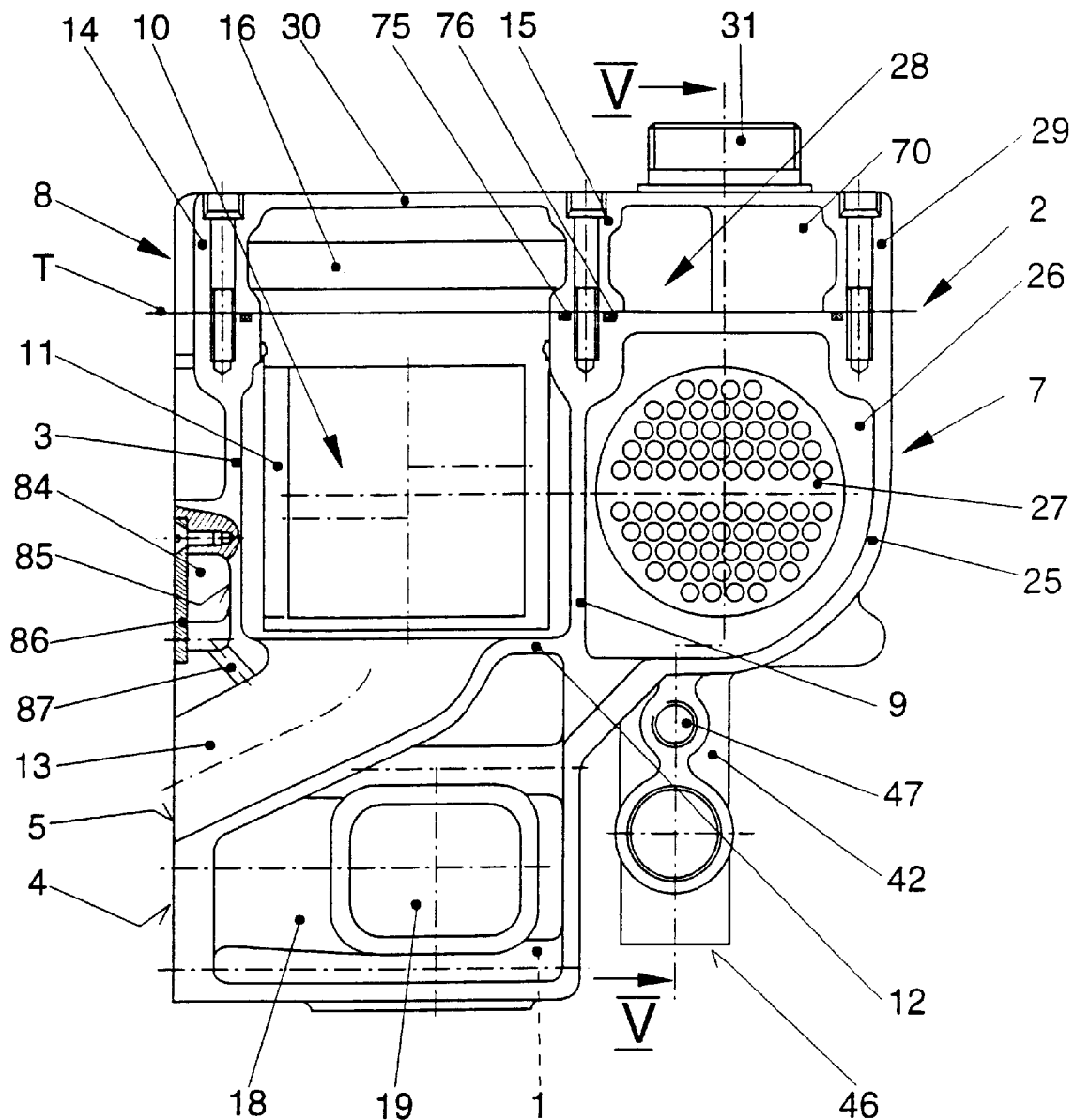
FIG. 4 is a cross-sectional view, taken on the line IV—IV in FIG. 2.

The housing wall 3 extends essentially perpendicularly to the parting plane T, as does a partition 9 which extends substantially parallel to the wall 3 as shown in FIG. 4.

Referring to FIG. 4, a passage 10 for combustion air between the housing wall 3 and the partition 9 contains an air/liquid heat exchanger 11. The passage 10 also has a bottom wall 12 from which a series of intake pipes 13, individual to the cylinders of the engine, extend to the exit openings 5. The housing cover 8 includes a wall segment 14 of the housing outer wall and an inner partition segment 15, and an air supply passage 16 is formed in the cover between the segments 14 and 15 extending over and sealing the passage 10. Into this air supply passage 16, combustion air is supplied by an air inlet 17 as described hereinafter.

Figure 6:
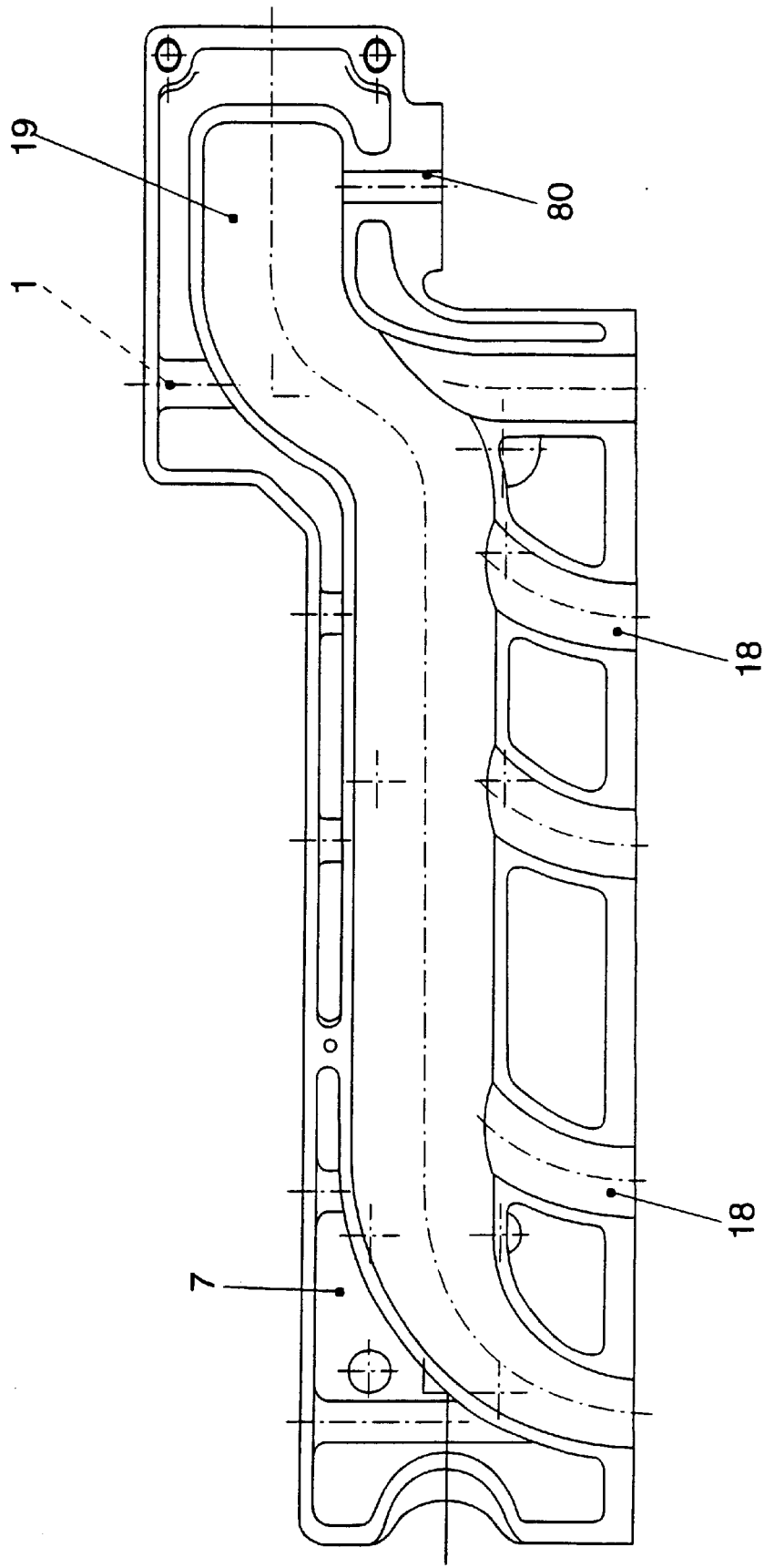
FIG. 6 is a cross-sectional view, taken on the line VI—VI in FIG. 2.

Beneath the bottom wall 12 and between the housing wall 3 and the partition 9, as best seen in FIGS. 4 and 6, individual cylinder exhaust lines 18 emanate from the exhaust openings 6, opening into a common exhaust manifold 19.

Figure 1:
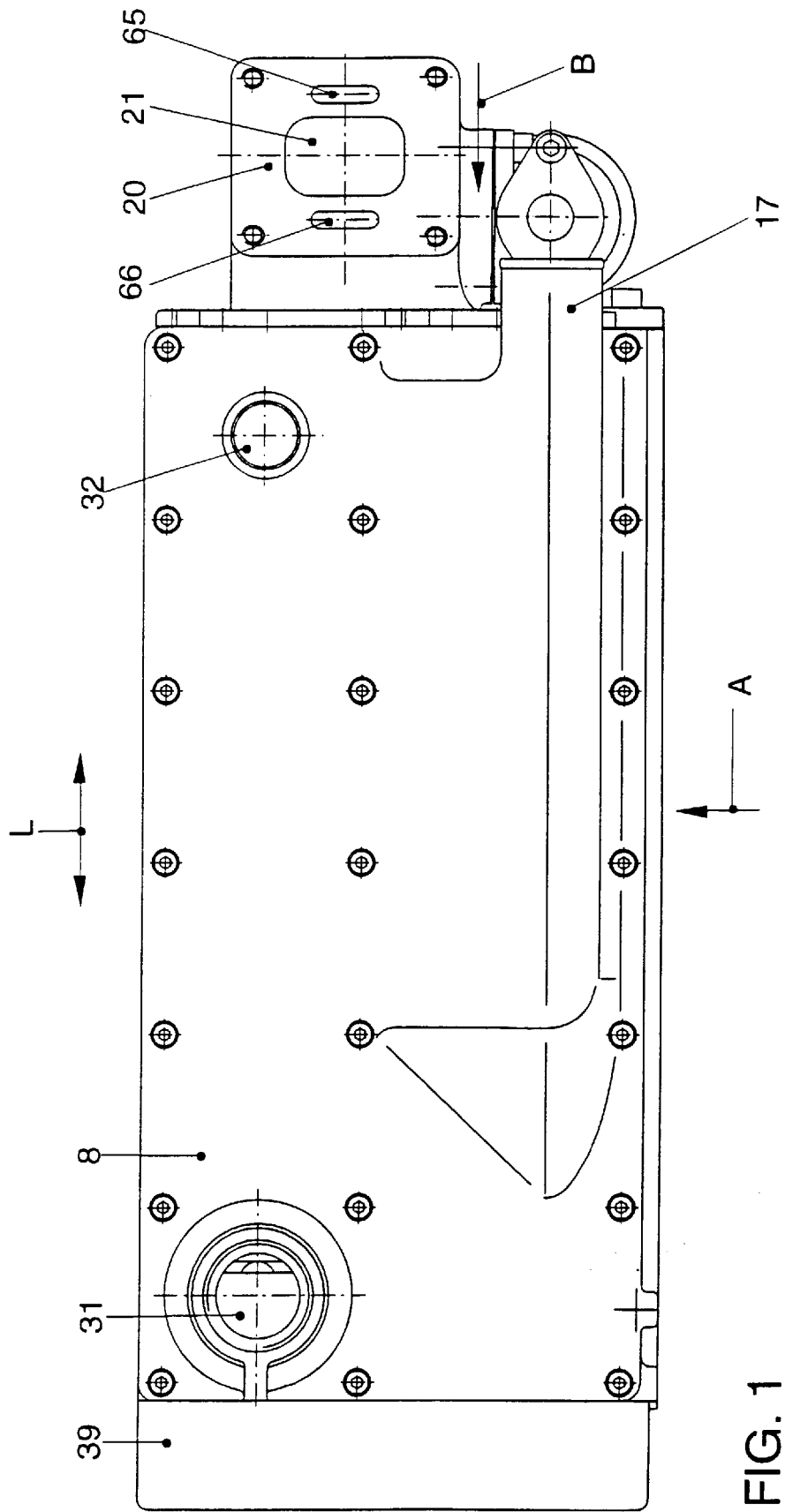
FIG. 1 is a top view of a representative embodiment of an arrangement for integrated handling of fluids in accordance with the invention.

The exhaust gas flow supplied to the manifold 19 leaves the housing 2 through an exhaust port 21 located in a connection flange 20 arranged at one end of the housing 2 as shown in FIGS. 1 and 2.

In the illustrated embodiment, a supercharger 22 for combustion air, which may be a conventional exhaust gas turbocharger, is affixed to the connection flange 20. The air compressor in the supercharger 22, which is driven by the exhaust gas turbine, delivers compressed air to the air inlet 17.

On the opposite side of the partition 9 from the housing wall 3, the housing 2 has an outside wall 25 as shown in FIG. 4. This wall encloses a liquid-filled cooler chamber 26 alongside the passage 10 in which a liquid/liquid heat exchanger 27 is mounted.

Figure 3:
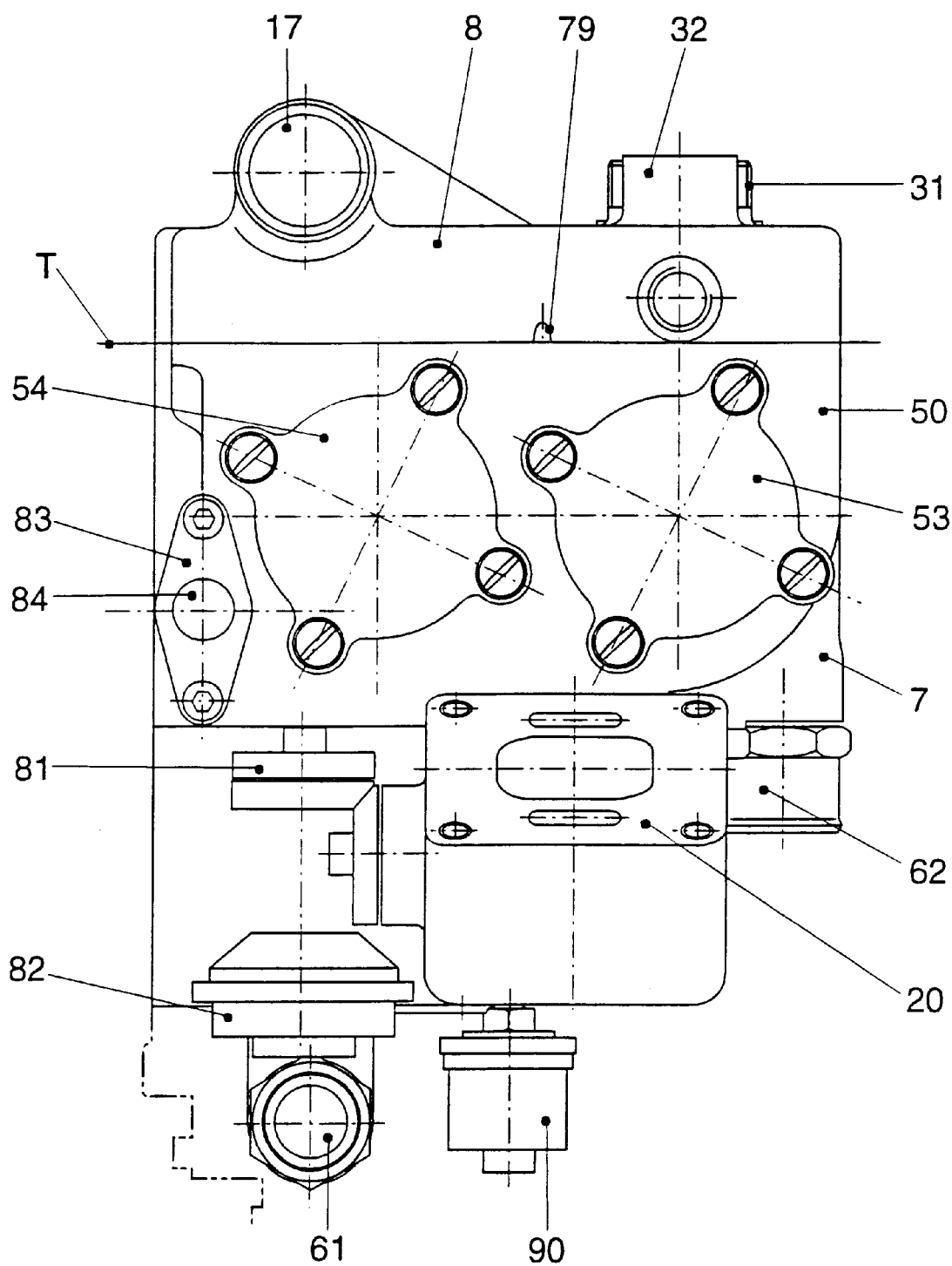
FIG. 3 is an end view of the arrangement without the supercharger looking in the direction of the arrow B in FIG. 1.

Above the parting plane T, the cooler chamber 26 has a cooling liquid tank 28 which functions as an expansion tank. As shown in FIG. 4, the tank 28 is bounded on one side essentially by the partition segment 15 and on the other side by an outer wall segment 29. Above the cooling liquid tank 28, the housing cover 8 has a fill opening 31 in a head 30 and a nozzle 32 for a coolant level sensor as shown in FIG. 3.

Figure 5:
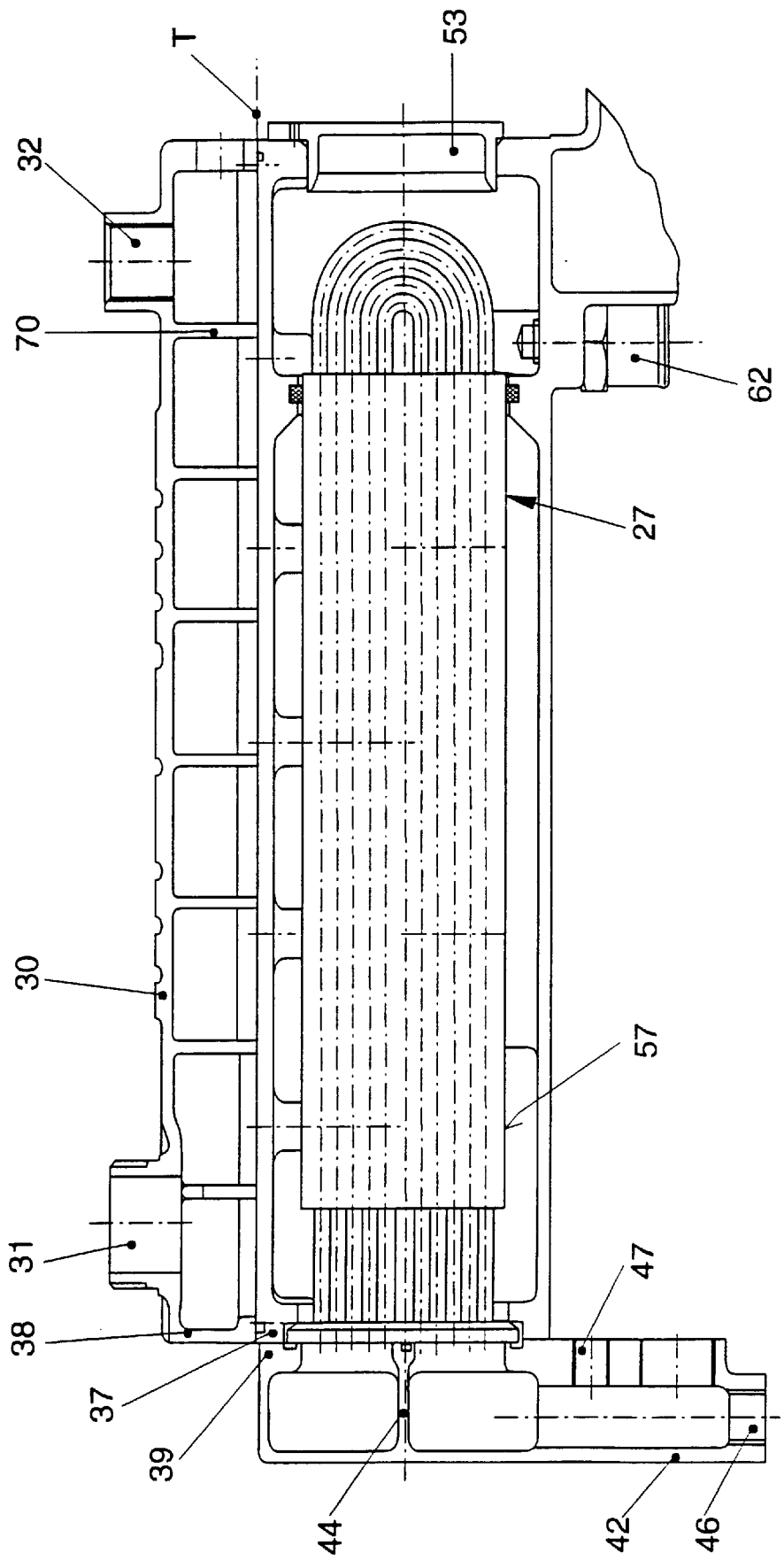
FIG. 5 is a cross-sectional view, taken on the line V—V in FIG. 4.
Figure 8:
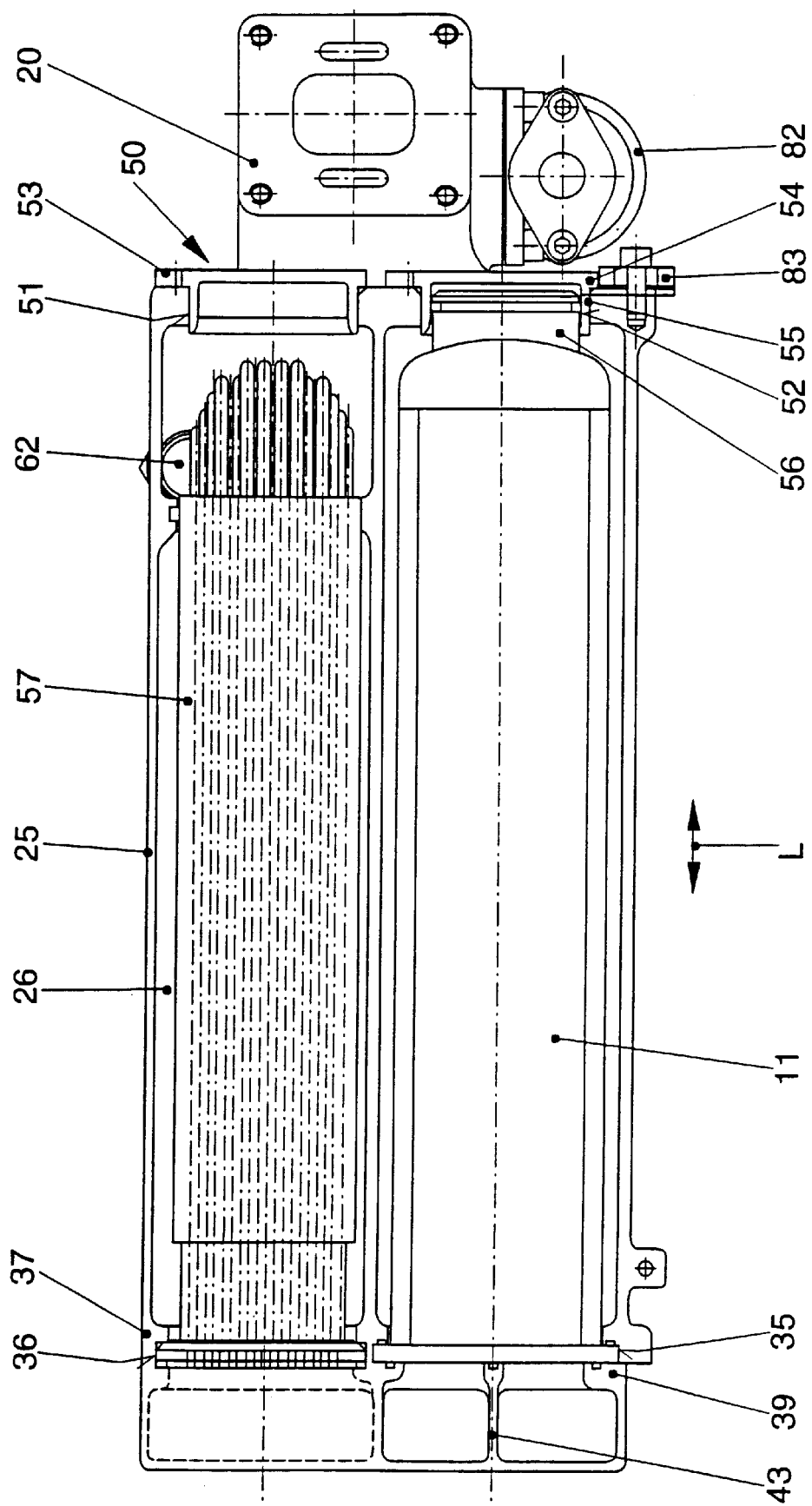
FIG. 8 is a cross-sectional view, taken on the line VIII—VIII in FIG. 2.

At the end opposite from the supercharger 22, the housing has an end wall 37 provided with openings 35 and 36 in the region of the passage 10 and the heat exchanger 27 as shown in FIG. 8. A transverse wall segment 38 forms an outer wall of the housing cover 8 as shown in FIG. 5. The openings 35 and 36 in the housing body 7 are covered by a manifold housing 39 for a cooling liquid. As shown in FIG. 2, at the bottom 40 of the manifold 39 is an inlet 41 for sea water and, adjacent thereto, a sea water outlet nozzle 42. Baffles 43 and 44 inside the manifold housing 39, shown in FIGS. 6 and 8, are arranged so that the incoming water first passes one way through the intake air cooler 11 in a lengthwise direction L, is turned around at the opposite end of the cooler I 1, and is returned in the lengthwise direction L to the manifold housing 39. Next, the sea water is fed by way of an overflow passage formed in the manifold housing 39 to the tube bank heat exchanger 27 where it passes again in the lengthwise direction L and is turned around at the opposed end, and then returns to the manifold 39 where it enters the water outlet nozzle 42. To avoid corrosion problems, the nozzle 42 comprises a receptacle 46 for a reactive anode and a receptacle 47 for a temperature sensor as shown in FIG. 5.

At the opposite end 50 of the housing 2 from the end wall 37, the housing has openings 51 and 52, shown in FIG. 8, which are aligned with the openings 35 and 36 and are closed by covers 53 and 54. The covers 53 and 54 are shown as separate parts in FIG. 8, but they may be united in one part. The cover 54 comprises a sleeve 55 which is received in the opening 52 and which, in turn, receives an end projection 56 of the air/liquid heat exchanger 11 for cooling the intake air to support the heat exchanger in the air path. The end 50 of the heat exchanger 27 has an outer sheath 57 by which it is supported inside the cooler chamber 26.

The fresh water to be cooled for engine coolant circulation is supplied to the housing 2 from an engine cooling water inlet 61 at the bottom 60 of the housing as shown in FIG. 2. From the inlet 61 the water passes countercurrent to the exhaust lines 18 or the exhaust manifold 19 toward the sea water manifold 39, and in the region of the end wall 37 it passes into the heat exchanger 27. The water then flows through the outer envelope 57, shown in FIG. 8, from which it is forced into a meandering course by internal baffles, until it passes to an engine cooling water outlet 62 located near the cover 53.

A partial stream of the fresh water from the engine cooling water inlet 61 (FIG. 2) is directed to cool the supercharger 22. For that purpose water is supplied to the turbocharger through an outlet opening 65 located in the connection flange 20 as shown in FIG. 1 and, after cooling the supercharger, it returns to the housing 2 through an entrance opening 66. Air bubbles that may accumulate in the supercharger 22 are removed by a vent line 67 from the high point of the supercharger and transferred to the cooling liquid tank 28.

Figure 7:
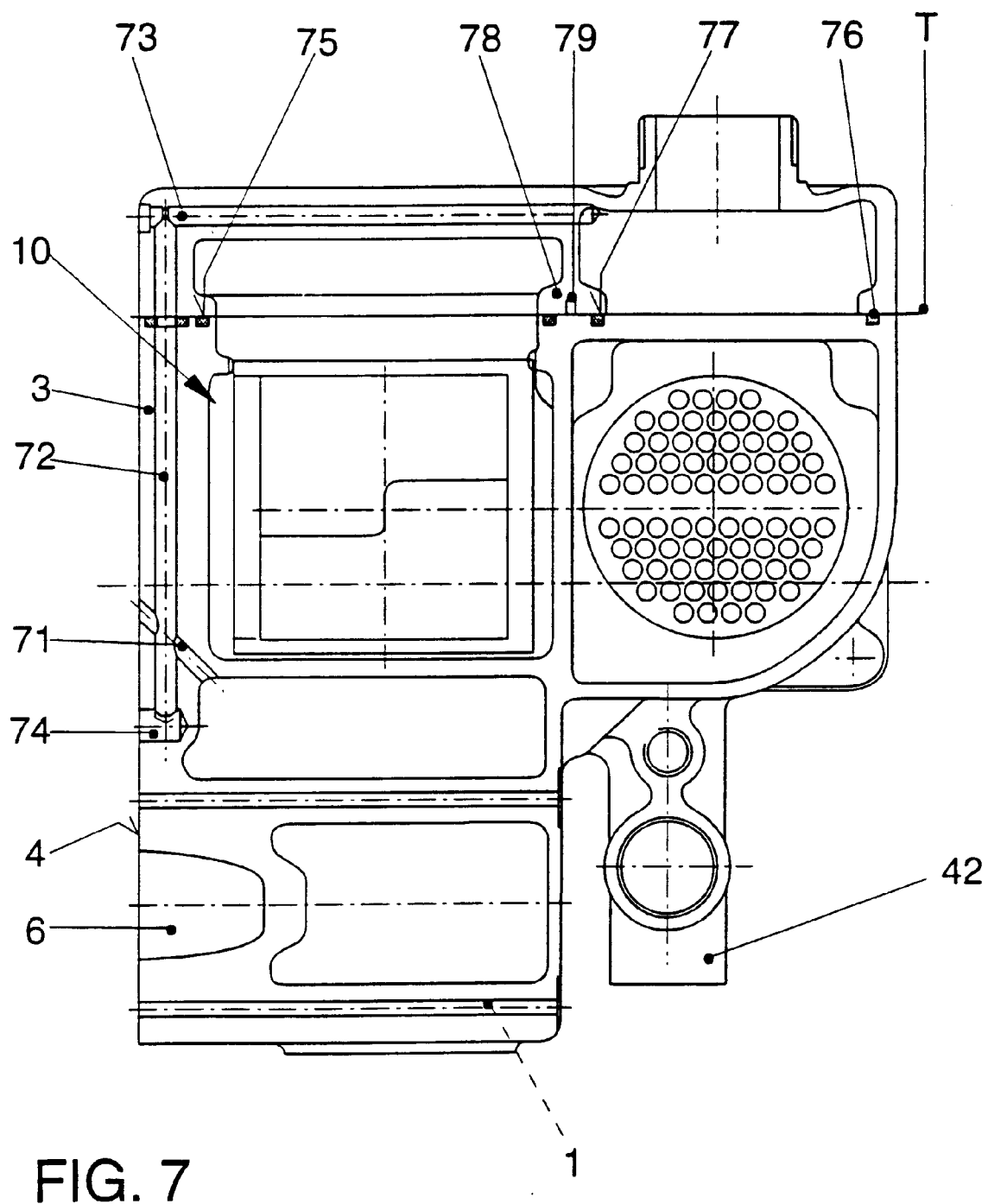
FIG. 7 is a cross-sectional view, taken on the line VII—VII in FIG. 2.

The portion of the coolant liquid tank 28 located above the heat exchanger 27, which acts as an expansion vessel, contains labyrinthine baffles 70 for systematic degassing of the engine cooling water as shown in FIG. 5. Air bubbles collecting under the head 12 are likewise passed to the expansion vessel by a plurality of holes 71, 72 and 73 shown in FIG. 7. Another hole 74 opens into the connection flange 4 and intersects the hole 72 for direct transfer of cooling liquid and gas bubbles from the cylinder head into the expansion vessel.

To seal off the liquids and gases appropriately, two O-ring seals 75 and 76 are mounted in the body 7 of the housing at the parting plane T.

As an additional safety measure against entry of engine cooling water into the intake air, a gutter 79 extending in the lengthwise direction L is formed in a sealing surface 77 of a sealing flange 78 of the partition segment in the cover. The gutter opens out in the end face 50 as shown in FIG. 3 and so conducts any cooling water that may have escaped the O-ring seals to an outlet opening.

To maintain more exacting exhaust emission limits, the housing 2 may include an exhaust gas return in the region of the connection flange 20. This arrangement removes the entire exhaust gas return function from the internal combustion engine itself in the region of the connection flange 20. For this purpose the body 7 of the housing has an opening 80, shown in FIG. 6, for supplying exhaust gas from the manifold 19 to an exhaust return valve, which is not shown for the sake of greater clarity. The return valve is attached to a holder 81, shown in FIG. 3, which is actuated in a conventional manner by a pressure chamber 82. When the exhaust gas return valve is open, it conducts a partial stream of exhaust gas to an exhaust gas return passage 84 having a flange 83. As shown in FIG. 4, the passage 84 is formed in a surprisingly simple manner by a gutter 85 in the housing wall 3 which is closed by a cover 86 to form the exhaust return passage 84. The exhaust gas thus extracted is supplied as shown in FIG. 4 from the exhaust return passage 84 to the intake pipe 13 through a series of transverse holes 87 which are individual to the cylinders.

In operation of the arrangement according to the invention, the temperatures and/or pressures of the gaseous and liquid media involved are monitored, as for example using the sensor receptor 47 previously discussed. In addition, an intake air pressure sensor 90 is arranged on the housing under side 60 or in any other location, and an intake air temperature sensor 91 is provided in the end wall 37 as shown in FIG. 2. During a cold start of the engine, the heat exchanger 27 is bypassed in the first instance in a conventional manner using a thermostat in the coolant line from the engine.

If the system is to be operated without a supercharger 22, it is a simple matter to connect an exhaust line, optionally cooled by the outlet and inlet coolant openings 65 and 66 respectively, directly to the flange 20. In the case of this free intake engine, the fresh air is supplied by way of the air inlet 17 directly to the intake pipe 13 by way of the passage 10, dispensing with any intake air cooling. By using a modified manifold housing 39, and/or by insertion of a suitable closure or reversal plate in the manifold housing 39 described herein, the flow of sea water through the air shaft 10, which is superfluous in the case of the free intake engine, is prevented and the sea water entering the manifold housing 39 goes directly to the heat exchanger 27.

In another arrangement of the coolers 11 and/or 27, the reversal of the sea water flow path next to the covers 53 and 54 can be effected separately for each of the coolers 11 and 27, which simplifies manufacture. In this case the covers 53 and 54 may be provided with baffles in a manner comparable to the manifold housing 39, ensuring that the streams of water coming directly from the coolers 11 and 27 are reversed inside the cover and returned into the coolers. Another advantage of this arrangement is an improved ability to clean the tube bank.

Although the invention has been described herein with reference to specific embodiments, many modifications and variations therein will readily occur to those skilled in the art. Accordingly, all such variations and modifications are included within the intended scope of the invention.

We claim:

1. An arrangement for integrated handling of liquid and gaseous media comprising a housing having a mounting surface for mounting the housing adjacent to a cylinder head of an engine, a passage for combustion air inside the housing adjacent to a housing wall facing the mounting surface, a first heat exchanger adjacent to a side of the housing away from the mounting surface, wherein the housing includes a body and a cover separated by a parting plane which runs substantially perpendicular to the mounting surface and wherein the housing body contains the passage for combustion air and includes a plurality of intake pipes for suppling combustion air directly to corresponding intake ducts in an engine cylinder head and also contains the first heat exchanger for supplying combustion air to the plurality of intake pipes, and the cover forms an air supply shaft covering the passage.

2. An arrangement according to claim 1 including a second heat exchanger in the passage.

3. An arrangement according to claim 2 wherein the first heat exchanger is a liquid/liquid heat exchanger and the second heat exchanger is an air/liquid heat exchanger.

4. An arrangement according to claim 1 wherein the housing comprises a partition in both the housing body and the housing cover extending substantially perpendicularly to the parting plane between the passage and the first heat exchange.

5. An arrangement according to claim 4 wherein a segment of the partition in the housing together with a segment of the partition in the cover form the air supply shaft, and including a liquid reservoir between the partition and an outer wall of the housing extending substantially parallel to the air supply shaft.

6. An arrangement according to claim 5, wherein the partition segment in the cover adjacent to the parting plane comprises a sealing surface formed on a sealing flange and includes a gutter extending to at least one end of the cover.

7. An arrangement according to claim 1 further comprising a gutter in the housing mounting surface adjacent to the intake pipes, a cover for the gutter, and exhaust gas return passages connecting each of the intake pipes with the gutter.

8. An arrangement according to claim 1 including a duct extending lengthwise in the mounting surface next to the intake pipes to form an exhaust gas return passage and including a series of openings providing communication between each intake pipe and the duct.

9. An arrangement according to claim 1 including an end wall at one end of the housing provided with openings located in the region of the passage carrying combustion air and the heat exchanger, and a manifold housing containing baffles arranged at the end wall for a cooling liquid supply.

\* \* \* \* \*